United States Patent
Osawa et al.

(10) Patent No.: US 8,051,742 B2
(45) Date of Patent: Nov. 8, 2011

(54) STEERING WHEEL POSITION ADJUSTMENT DEVICE

(75) Inventors: Toshihito Osawa, Gunma-ken (JP); Suguru Sugishita, Gunma-ken (JP)

(73) Assignee: Yamada Manufacturing Co., Ltd., Kiryu-Shi, Gunma-Ken (JP)

( * ) Notice: Subject to any disclaimer, the term of this patent is extended or adjusted under 35 U.S.C. 154(b) by 735 days.

(21) Appl. No.: 12/155,652

(22) Filed: Jun. 6, 2008

(65) Prior Publication Data

US 2009/0044657 A1   Feb. 19, 2009

(30) Foreign Application Priority Data

Aug. 17, 2007 (JP) .................. 2007-212984

(51) Int. Cl. *B62D 1/18* (2006.01)
(52) U.S. Cl. ........................................ 74/493
(58) Field of Classification Search ......... 74/492, 74/493; 280/775
See application file for complete search history.

(56) References Cited

U.S. PATENT DOCUMENTS

| | | | |
|---|---|---|---|
| 5,915,726 A * | 6/1999 | Hibino et al. ........ | 280/775 |
| 7,441,807 B2 * | 10/2008 | Yoshimoto et al. ...... | 280/777 |
| 7,607,694 B2 * | 10/2009 | Shinohara et al. ...... | 280/775 |
| 2004/0104565 A1 | 6/2004 | Tsuji et al. | |
| 2006/0230864 A1 | 10/2006 | Shinohara et al. | |

FOREIGN PATENT DOCUMENTS

| | | |
|---|---|---|
| JP | 64-28365 | 1/1989 |
| JP | 2006-240327 | 9/2006 |
| JP | 2006-250327 | 9/2006 |

OTHER PUBLICATIONS

European Search Report dated Aug. 27, 2009.

* cited by examiner

*Primary Examiner* — Thomas R Hannon
*Assistant Examiner* — Phillip A Johnson
(74) *Attorney, Agent, or Firm* — McGinn IP Law Group, PLLC

(57) ABSTRACT

A steering wheel position adjustment device includes a movable bracket having adjusting long holes on both sides in a width direction of the movable bracket, a fixed bracket, a lock shaft penetrating through both of the adjusting long holes to support the movable bracket to the fixed bracket, a collar member which is rotatably supported within the movable bracket by the lock shaft and is capable of moving along, with the lock shaft, in a longitudinal direction and stopper shock-absorbing materials, which are attached to both side sections in the longitudinal direction of the adjusting long holes within the movable bracket, and each of which is formed thereon with an abutment surface against which the collar member abuts.

6 Claims, 12 Drawing Sheets

La < wa < Lb

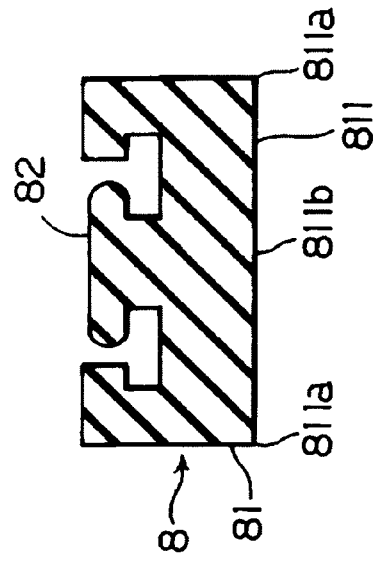
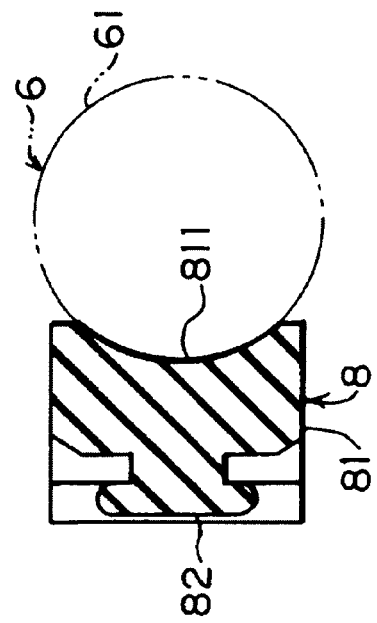
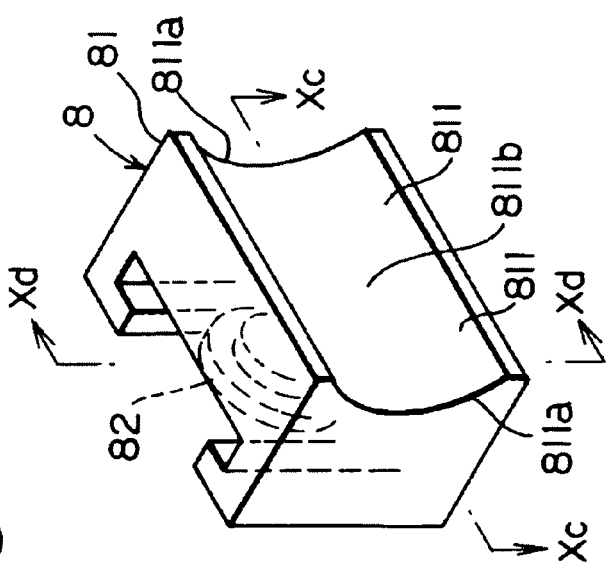

Fig.11A
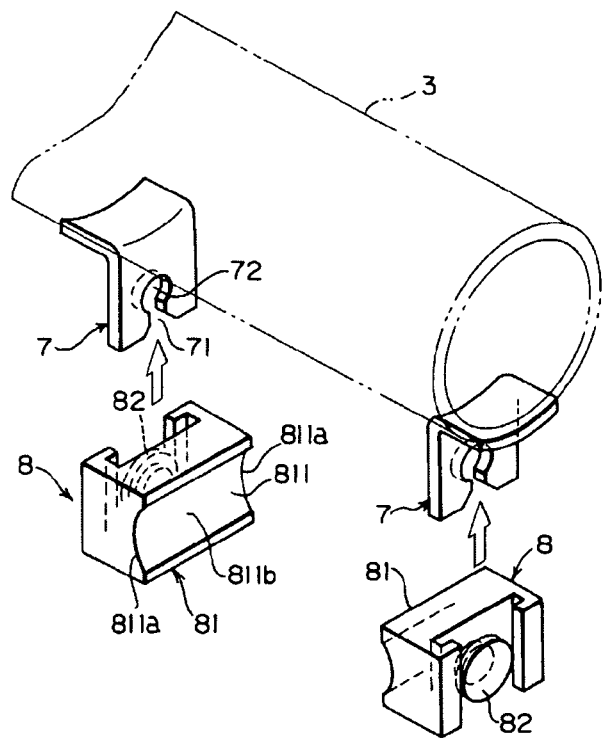
Fig.11B
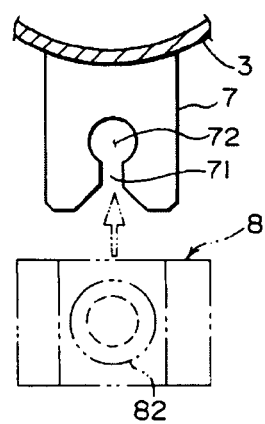
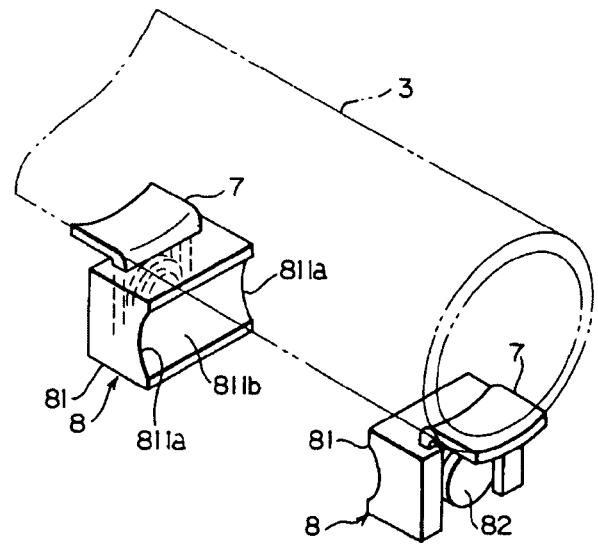
Fig.11C

GRAPH SHOING THE RELATIONSHIP
BETWEEN STROKE AND GENERATION G (END SURFACE)

GRAPH SHOWING THE RELATIONSHIP BETWEEN
TELESCOPIC SPEED AND GENERATON G

STEERING WHEEL POSITION ADJUSTMENT DEVICE

BACKGROUND OF THE INVENTION

1. Field of the Invention

The present invention relates to a steering wheel position adjustment device in which a stopper shock-absorbing material for absorbing shocks during tilt/telescopic adjustment can be mounted on a predetermined position extremely easily and shock-absorbing capacity for tilt/telescopic adjustment can be improved in a steering device having a tilt/telescopic adjustment mechanism.

2. Description of the Related Art

A steering device with a tilt/telescopic adjustment mechanism, which is capable of adjusting the position of the steering wheel vertically and longitudinally in accordance with the physical constitution of a driver, has been conventionally frequently used (see Unexamined Utility Model Application Publication S64-28365 and Japanese Published Unexamined Patent Application No. 2006-240327). In the structure of this steering device having a tilt/telescopic adjustment mechanism, tilting and telescopic long holes are formed in a bracket portion, and a lock lever shaft and the like which penetrate through these long holes are inserted and disposed. The problem in this structure is that when a metallic bolt is moved along the long holes, end surfaces of the long holes, also made of metal, collide with the bolt at a tilt/telescopic operation limit position, thereby causing metallic clank and impairing quietness and soft operational touch in the operation limit position when the bolt and the end surfaces of the long holes hit against each other.

In order to prevent metallic contact between the bolt and the long hole end portions of the bracket member, there is considered means for absorbing shocks by attaching a stopper material formed by a rubber, a synthetic resin or the like to the long hole end portions so that the bolt shaft and the long hole end portions do not abut against each other directly.

As disclosed in Unexamined Utility Model Application Publication S64-28365 and Japanese Published Unexamined Patent Application No. 2006-240327, the stopper shock-absorbing material made of a rubber, a synthetic resin or the like was attached, whereby it was possible to absorb shocks and realize quietness. In recent years, however, as to operational feeling in tilt/telescopic adjustment of the steering wheel, it is required to provide automobiles with a higher level of quietness and operational touch in tilt/telescopic adjustment. An object of the present invention, therefore, is to improve operational feeling when performing the adjustment, and particularly to reduce shocks and impact noises that are caused at the time of operation.

SUMMARY OF THE INVENTION

Therefore, in order to solve the above-described problem, the inventors have conducted keen research and, as a result, solved the problem by configuring an exemplary embodiment of the invention as a steering wheel position adjustment device, including a movable bracket having adjusting long holes on both sides in a width direction of the movable bracket, a fixed bracket, a lock shaft penetrating through both of the adjusting long holes to support the movable bracket to the fixed bracket, a collar member which is rotatably supported within the movable bracket by the lock shaft and is capable of moving along, with the lock shaft, in a longitudinal direction, and stopper shock-absorbing materials, which are attached to both side sections in the longitudinal direction of the adjusting long holes within the movable bracket, and each of which is formed thereon with an abutment surface against which the collar member abuts. When each of the stopper shock-absorbing materials and the collar member abut against each other, both end portions in a width direction of the abutted surface of the stopper shock-absorbing material are first brought into abutment.

The above-described problem is solved by configuring an exemplary embodiment of the invention as the steering wheel position adjustment device according to the abovementioned configuration, where in the collar member, a cylindrical shape portion is formed in a central portion in an axial direction of the collar member and conical portions are formed such that a diameter of each of the conical portions gradually increases toward both ends in a width direction of the cylindrical shape portion, and wherein both of the end portions in the width direction of the abutment surface of the stopper shock-absorbing material abut against the conical portion. The above-described problem is solved by configuring an exemplary embodiment of the invention as the steering wheel position adjustment device according to the abovementioned configuration, where the central portion in the axial direction of the collar member is a smallest diameter portion, and a cross-sectional shape of the collar member along the axial direction is formed in a substantially arched shape such that the diameter thereof gradually increases toward both sides in the axial direction.

The above-described problem is solved by configuring exemplary embodiments of the invention as the steering wheel position adjustment device according to the abovementioned configuration, where the abutted surface has a substantially concave arched cross section in the width direction thereof. The above-described problem is solved by configuring exemplary embodiments of the invention as the steering wheel position adjustment device according to the abovementioned configuration, where edge projecting portions are formed on the both end portions in the width direction of the abutted surface of the stopper shock-absorbing material.

In an exemplary embodiment of the invention, the abutted surface of the stopper shock-absorbing material abuts against the collar member during tilt/telescopic adjustment in a step in which the both end portions in the width direction of the abutted surface are first brought into abutment against collar member, and then the central section in the width direction of the abutted surface abuts against or comes close to the collar member. Accordingly, in the stopper shock-absorbing material, the both end portions in the width direction of the abutted surface are elastically deformed by abutting against the collar member, and shocks are temporally dispersed as compared with the ordinary case where the entire abutted surface abuts against the collar member at once, whereby the shock force generated when the collar member and the stopper shock-absorbing material hit against each other can be further reduced and quietness and operational touch in telescopic adjustment can be improved.

According to an exemplary embodiment of the invention, the cylindrical shape portion is formed in the central portion in the axial direction of the collar member, the conical portions are formed on both sides in the width direction of the cylindrical shape portion, respectively, such that the diameters of the conical portions gradually increase toward respective end portions in the axial direction of the collar member, and the width direction of the abutted surface of the stopper shock-absorbing material is formed to be larger than that of the cylindrical shape portion. Accordingly, since the both end portions in the width direction of the stopper shock-absorbing material are brought into abutment against the conical portions of the collar member, the both end portions in the width direction of the abutted surface in particular are elastically deformed significantly, whereby shock absorption is extremely improved and quietness and operational touch in telescopic adjustment can also be improved.

According to an exemplary embodiment of the invention, the central portion in the axial direction of the collar member is configured as a smallest diameter portion, and a cross-sectional shape along the axial direction of the collar member is formed in a substantially arched shape such that the diameter thereof gradually increases toward the both sides in the axial direction. Accordingly, the both end portions and central portion in the width direction of the stopper shock-absorbing material can be entirely brought into abutment against the collar member smoothly, whereby quietness can be achieved. According to exemplary embodiments of the invention, the abutment surface has a substantially concave arched cross section in the width direction thereof. Therefore, it is sufficient that the collar member be formed into a cylindrical shape only so that a simple structure can be obtained. In an exemplary embodiment of the invention, edge projecting portions are formed on both of the end portions in the width direction of the abutted surface of the stopper shock-absorbing material. Therefore, it is sufficient that the collar member be formed into a cylindrical shape only so that a simple structure can be obtained.

BRIEF DESCRIPTION OF THE DRAWINGS

FIG. 8A is a perspective view showing the stopper shock-absorbing material of the first embodiment which corresponds to the collar members of the first and second embodiments;

FIG. 8B is a cross-sectional diagram taken along the arrow Xc-Xc of FIG. 8A;

FIG. 8C is a cross-sectional diagram taken along the arrow Xd-Xd of FIG. 8A;

FIG. 11A is an exploded perspective view showing attachment tools and the stopper shock-absorbing materials;

FIG. 11B is a front view of one of the attachment tools;

FIG. 11C is a perspective view showing a state in which the stopper shock-absorbing materials are attached to the attachment tools.

DESCRIPTION OF THE PREFERRED EMBODIMENTS

Figure 1A:
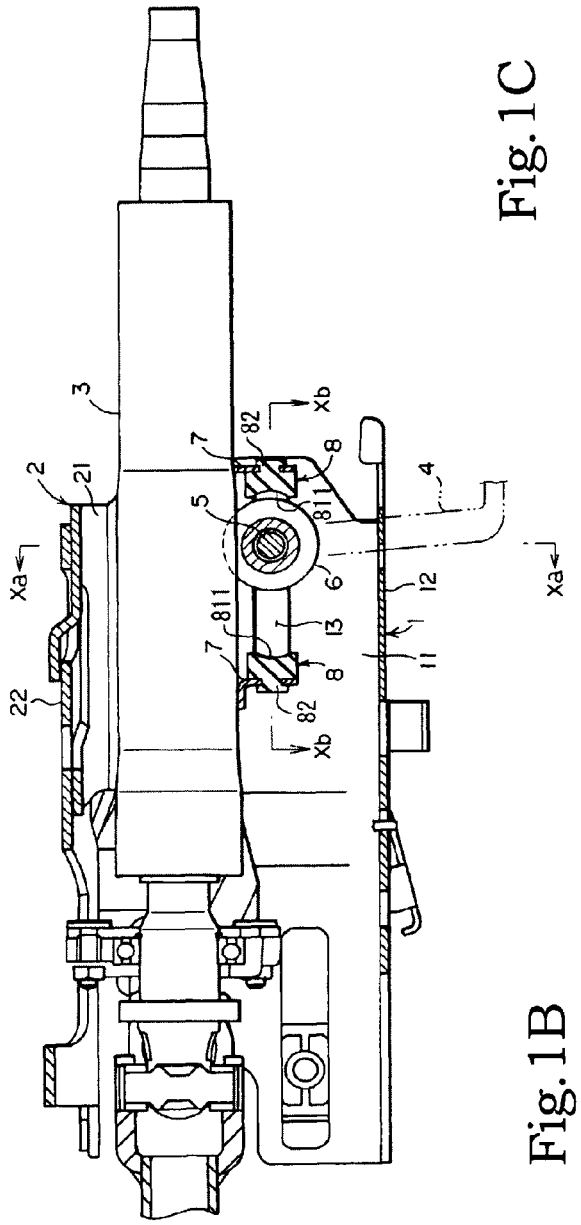
FIG. 1A is a side view showing a partial cross section of a steering device comprising the present invention.

Embodiments of the present invention will now be described hereinafter with reference to the drawings. First, as shown in FIG. 1, the present invention is mainly configured by a movable bracket 1, a fixed bracket 2, a collar member 6, and stopper shock-absorbing materials 8. Supporting side portions 11, 11 are formed on both sides in a width direction of the movable bracket 1. A bottom surface portion 12 which integrally couples the both supporting side portions 11, 11 together is formed underneath.

Figure 1C:
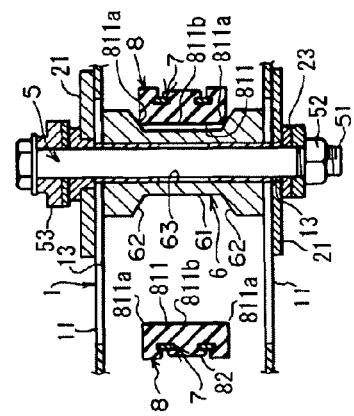
FIG. 1C is a cross-sectional diagram taken along the arrow Xb-Xb of FIG. 1A.
Figure 1B:
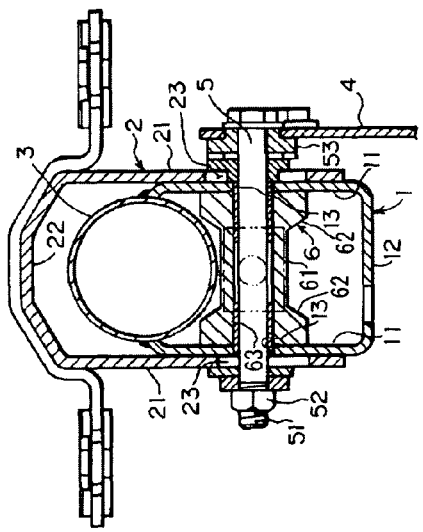
FIG. 1B is a cross-sectional diagram taken along the arrow Xa-Xa of FIG. 1A.

Also, a steering column 3 is disposed at upper end positions of the both supporting side portions 11, 11, and this steering column 3 is welded and fixed in a state such as to be roughly held between the both supporting side portions 11, 11 (see FIG. 1B). Adjusting long holes 13, 13 for performing telescopic adjustment are formed on the both supporting side portions 11, 11 of the movable bracket 1. Each adjusting long hole 13 is formed along a longer direction of the steering column 3 attached to the movable bracket 1.

Next, the fixed bracket 2 is a component which attaches the movable bracket 1 to a predetermined position within a vehicle and for performing tilt/telescopic adjustment. As shown in FIG. 1B, the fixed bracket 2 is configured by a pair of right and left fixed supporting side plates 21, 21 and an attachment apex 22. The fixed bracket 2 is attached to a predetermined position within the vehicle via a capsule member and is configured to be capable of absorbing shock energy generated at the time of collision and the like.

Moreover, tilt adjusting holes 23, 23 are formed on the both fixed supporting side plates 21, 21 of the fixed bracket 2. The positions of the tilt adjusting holes 23, 23 are aligned with the positions of the adjusting long holes 13, 13 of the movable bracket 1, and a lock shaft 5 is inserted into these holes (see FIG. 1B). Then, the both supporting side portions 11, 11 are attached in a state such as to be held between the both fixed supporting side plates 21, 21 of the fixed bracket 2 so that the both supporting side portions 11, 11 can be tightened and fixed by the lock shaft 5 (see FIG. 1B).

The lock shaft 5 locks (tightens) and unlocks steering during tilt/telescopic adjustment, and further serves to support the collar member 6 between the both supporting side portions 11, 11. The collar member 6 can freely move along with the lock shaft 5 through the adjusting long hole 13 in the longer direction. An operation lever 4 for performing tilt/telescopic adjustment is attached to the lock shaft 5 for tightening and releasing purposes. The lock shaft 5 is in the form of a bolt on which an outer screw portion 51 is formed, and is provided for tightening and releasing by means of a nut member 52, a cam member 53 and the like (see FIG. 1B).

Figure 2A:
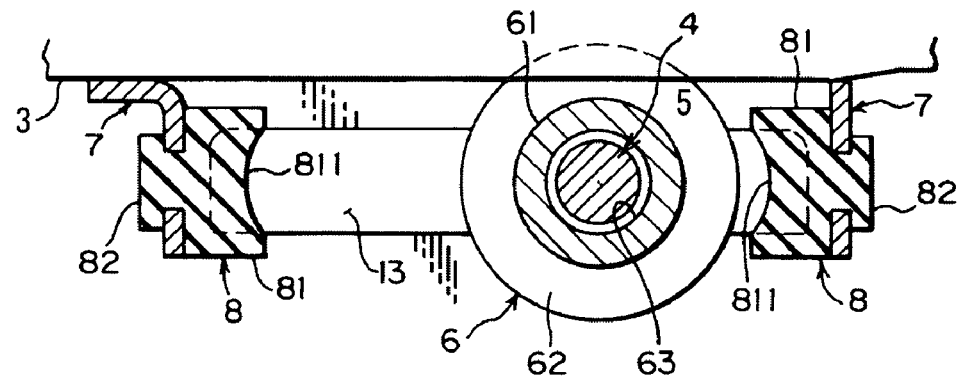
FIG. 2A is an enlarged cross-sectional diagram showing a substantial part of the present invention.

Next, attachment tools 7 are members which serve to dispose and attach stopper shock-absorbing materials 8 in the movable bracket 1. As shown in FIG. 1A and FIG. 2A, the attachment tools 7 are disposed so as to be placed within the movable bracket 1 and at both side sections in the longitudinal direction of the adjusting long hole 13, respectively. Practically the attachment tools 7 are fixed to the steering column 3 by welding means, the steering column 3 being fixed to the movable bracket 1 (see FIG. 11A). Here, the longitudinal direction means a direction which matches the longer direction or axial direction of the steering column 3, and corresponds to a horizontal direction which follows the longer direction of the steering column 3 in FIG. 1A. As described above, the attachment tools 7 are placed along the longitudinal direction within the movable bracket 1 and, more specifically, attached so as to be placed in both end sections in the longer direction of the adjusting long hole 13 formed in the movable bracket 1 (see FIG. 2A).

The stopper shock-absorbing materials 8, 8 are attached to the both attachment tools 7, 7 respectively, which are attached in the longitudinal direction. Accordingly, when the movable bracket 1 and the adjusting long holes 13 are moved in the longitudinal direction with reference to the shaft portion of the lock shaft 5 coupling the movable bracket 1 and the fixed bracket 2 together, the collar member 6 which is rotatably supported by the lock shaft 5 abuts against each of the stopper shock-absorbing materials 8 without abutting directly against the both ends in the longer direction of the adjusting long holes 13.

Figure 2B:
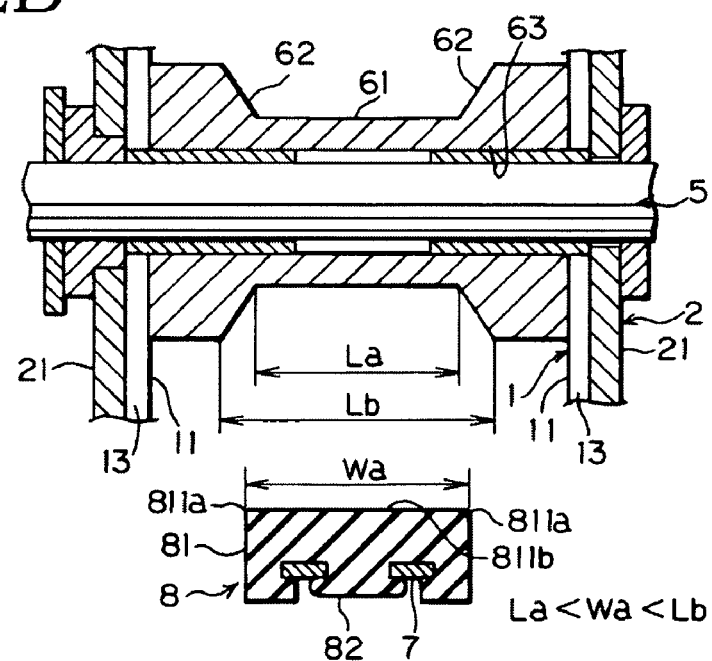
FIG. 2B is an enlarged cross-sectional diagram showing the shapes of a collar member and of a stopper shock-absorbing material according to a first embodiment.
Figure 3:
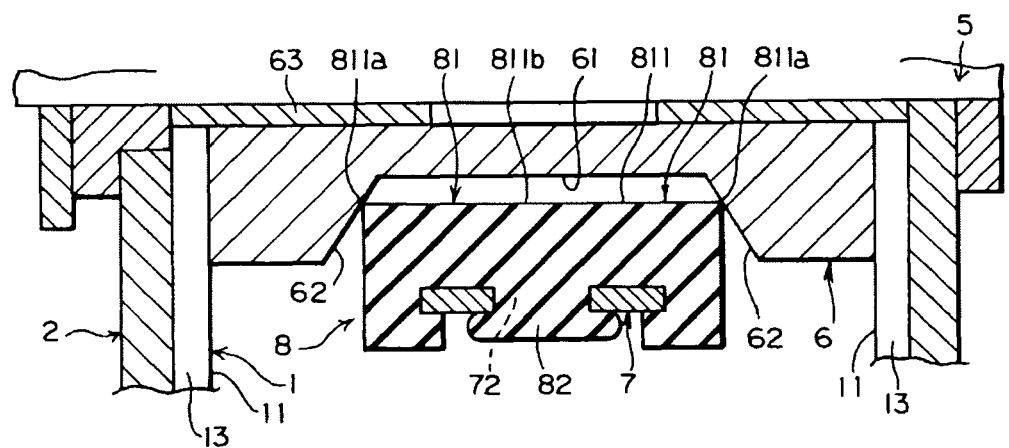
FIG. 3 is an enlarged cross-sectional diagram showing a state in which both end portions in a width direction of the stopper shock-absorbing material of the first embodiment abut against conical portions of the collar member of the first embodiment.
Figure 4A:
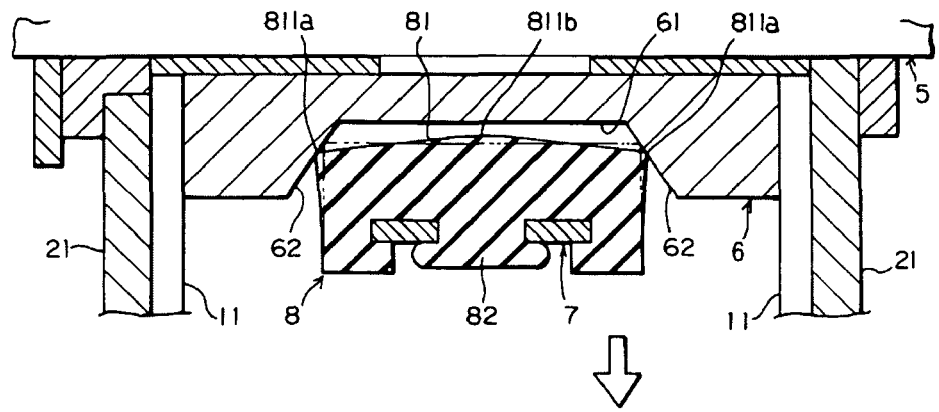
FIGS. 4A through 4C are operational diagrams each showing a step in which the collar member of the first embodiment and the stopper shock-absorbing material of the first embodiment abut against each other.
Figure 4B:
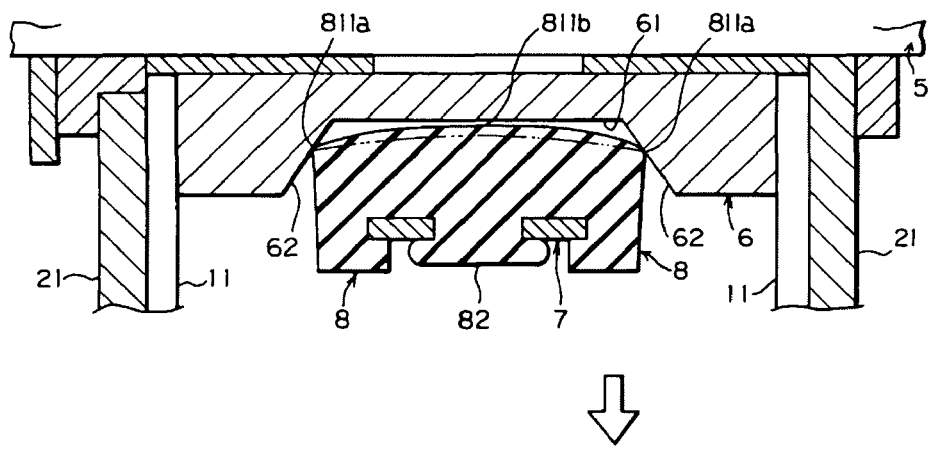
Figure 4C:
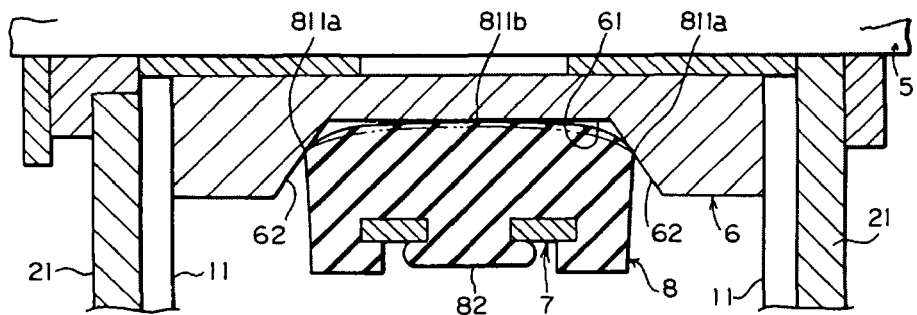

There are a plurality of embodiments regarding the collar member 6. In the first embodiment, the collar member 6 is formed into a substantially hollow cylindrical shape as shown in FIG. 1C, FIG. 2 and the like. A cylindrical shape portion 61 is formed in the central section in the axial direction, and conical portions 62, 62 are formed on both sides in the width direction of the cylindrical shape portion 61. The cylindrical shape portion 61 configures a cylindrical shape section whose diameter is constant throughout the region forming the cylindrical shape portion 61 along the axial direction. Each conical portion 62 is formed into a conical shape such that the diameter thereof gradually increases toward the end portions in the axial direction of the collar member 6. A rotatably supporting through-hole 63 is formed in the central position in the diameter direction of the collar member 6. The collar member 6 has the shape of a substantially bobbin and is symmetric with respect to the center in the axial direction.

The configuration of the collar member 6 according to the second embodiment is substantially the same as that of the collar member 6 according to the first embodiment, as shown in FIG. 5, but the central section in the axial direction is formed as a smallest diameter portion 64, which is formed such that the diameter thereof gradually increases toward the both sides in the axial direction. Furthermore, the outer circumference of the collar member 6 along the axial direction is formed into a substantially arched shape which curves at the central section in the axial direction. Moreover, the collar member 6 according to the third embodiment is formed into a complete cylindrical shape, as shown in FIG. 6 and FIG. 7. Specifically, the collar member 6 is formed such that the diameter thereof is constant throughout the whole position along the axial direction.

Each stopper shock-absorbing material 8 is configured mainly by an elastic main body portion 81 and a projecting portion 82. The stopper shock-absorbing material 8 is formed by an elastic material, such as a rubber or synthetic resin, and is integrally formed by the elastic main body portion 81 and the projecting portion 82. The elastic main body portion 81 is formed into a substantially thick plate shape and configures an abutted surface 811, which is the surface abutting against the collar member 6. The abutted surface 811 is formed into substantially rectangular or square shape. Both end sides in a width direction of the abutted surface 811 are first brought into abutment against the collar member 6, and after a certain time interval the central section in the width direction of the abutted surface 811 abuts against or comes close to the collar member 6.

End portions 811a, 811a on both sides in the width direction of the abutted surface 811 are the sections which are brought into abutment first when the collar member 6 and the stopper shock-absorbing material 8 about against each other. A central portion 811b in the width direction of the abutted surface 811 abuts against or comes close to the collar member 6 after the both of the end portions 811a, 811a abut against the collar member 6 (see FIGS. 4A through 4C, FIG. 5 through FIG. 7, and the like). The central portion 811b of the stopper shock-absorbing material 8 indicates the central point and the area adjacent thereto in the axial direction.

As shown in FIG. 2A, FIGS. 8A and 8C, FIG. 9, FIG. 10 and the like, the abutted surface 811 is formed as a concave surface having a substantially arched cross-sectional shape along the vertical direction thereof. The radius of curvature of the concave arched surface between the both ends in the width direction of the abutted surface 811 and in the vertical direction of the same is substantially equal to the diameter of the cylindrical shape portion 61 of the collar member 6: that is, the concave arched surface is formed such that its radius of curvature is substantially equal to the diameter of the section where the collar member 6 and the abutted surface 811 abut against each other (see FIG. 8C).

Figures 9A, 9B:
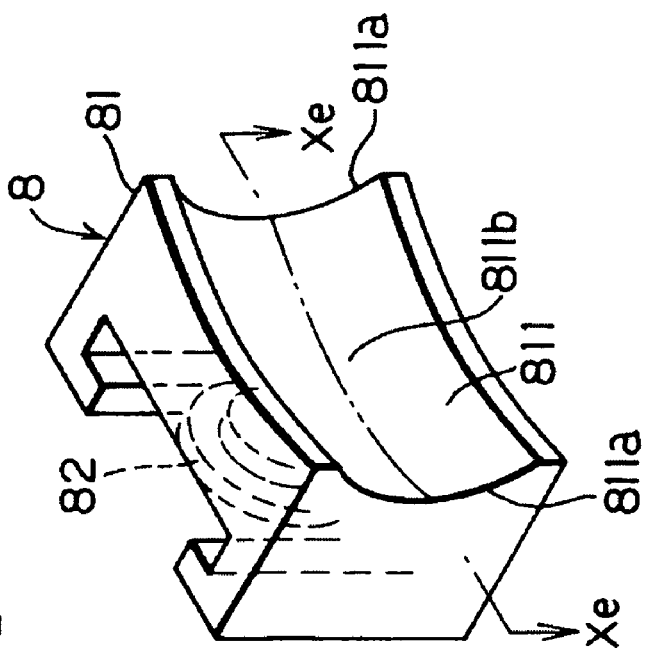
FIG. 9A is a perspective view showing the first type of stopper shock-absorbing material of the second embodiment which corresponds to the collar member of the third embodiment.
FIG. 9B is a cross-sectional diagram taken along the arrow Xe-Xe of FIG. 9A.

The arched surface is formed such that the axial direction thereof follows the width direction of the elastic main body portion 81. As shown in FIG. 8B, FIG. 9B and the like, the projecting portion 82 of the stopper shock-absorbing material 8 is formed into a substantially flat cylindrical shape and formed so as to project in a substantially perpendicular direction from the rear surface of the elastic main body portion 81. A guide groove 71 and a fitting hole 72 into which the projecting portion 82 of the stopper shock-absorbing material 8 is inserted and fitted are formed in each attachment tool 7 (see FIG. 11B), whereby the projecting portion 82 of the stopper shock-absorbing material 8 is guided by the guide groove 71 and fitted and fixed into the fitting hole 72 (see FIGS. 11A through 11C).

As to the shape of the abutted surface 811 of the stopper shock-absorbing material 8, there are various embodiments in accordance with the shape of the collar member 6 of the first through third embodiments. First of all, in the stopper shock-absorbing materials 8 of the first embodiment, which are applied to the collar member 6 of the first embodiment described above, the abutted surface 811 is formed to have the same arched cross-sectional shape along the width direction (see FIG. 4, FIG. 8). The size in the width direction of the abutted surface 811 is represented as Wa. In addition, the size in the axial direction of the cylindrical shape portion 61 of the collar member 6 is represented as La, and the size between the outermost ends of the respective conical portions 62, 62 as Lb. The size Wa is set to be larger than the size La and smaller than the size Lb. Specifically, La<Wa<Lb is established (see FIG. 2B).

When telescopic adjustment is performed in such a combination of the collar member 6 and the stopper shock-absorbing materials 8, the collar member 6 is first moved toward either one of the stopper shock-absorbing materials 8 in the longitudinal direction, and, at the instant of abutment of the collar member 6, the both end portions 811a, 811a in the width direction of the abutted surface 811 first abut against the inclined surfaces of the conical portions 62, 62, respectively. Then, when the collar member 6 is further moved close to the stopper shock-absorbing material 8, the stopper shock-absorbing material 8 gradually abuts (or sometimes only comes close) such that the central portion 811b in the width direction of the abutted surface 811 comes close to the cylindrical shape portion 61 as the both end portions 811a, 811a in the width direction of the abutted surface 811 are elastically deformed.

In this manner, in the abutted surface 811 of the stopper shock-absorbing material 8, the central section in the width direction of the abutted surface 811 abuts against or comes close to the cylindrical shape portion 61, while the both ends in the width direction of the abutted surface 811 of the stopper shock-absorbing material 8 start to abut against the both conical portions 62, 62 of the collar member 6, respectively. Accordingly, the both end sections in the width direction of the abutted surface 811 which is elastically deformed easily abut against the conical portions 62, 62 of the collar member 6, respectively, whereby the stopper shock-absorbing material 8 is subjected to not only compressional deformation but also shear deformation at an early stage of abutment between the stopper shock-absorbing material 8 and the collar member 6. Therefore, as compared with the ordinary case where the entire abutted surface 811 abuts against the collar member 6 at once, the amount of deformation of the abutted surface 811 can be increased and more shock load can be absorbed.

Specifically, a so-called second-stage abutment operation is performed in which, at the instant of abutment between the collar member 6 and the stopper shock-absorbing material 8, the both end portions 811a, 811a of the abutted surface 811 abut against the collar member 6 first, and after a certain time interval the central portion 811b of the abutted surface 811 abuts against the outer circumferential surface of the collar member 6 (see FIG. 4). Accordingly, quietness in abutment can be secured. Therefore, the shock force generated when the collar member 6 and the stopper shock-absorbing material 8 hit against each other during telescopic adjustment can be further reduced, and quietness and operational touch in telescopic adjustment can be improved.

Figure 5A:
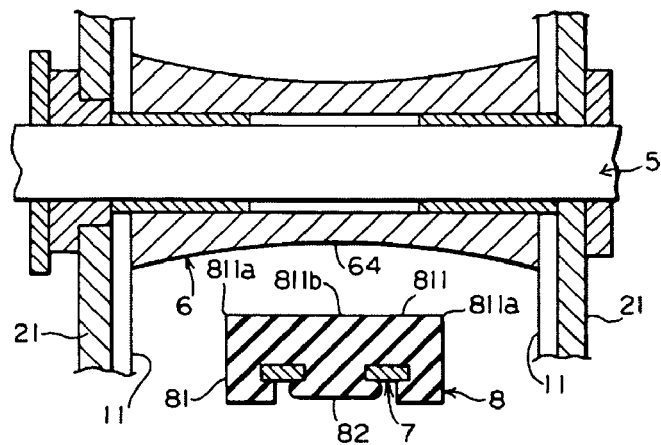
FIG. 5A is a cross-sectional diagram showing the configurations of a collar member of a second embodiment and of the stopper shock-absorbing material of the first embodiment.

Next, the stopper shock-absorbing materials 8 of the first embodiment are applied to a collar member 6 of the second embodiment, and in this case the abutted surface 811 is formed to have the same arched cross-sectional shape along the width direction (see FIG. 5A). As compared with the collar member 6 of the first embodiment, in the collar member 6 of the second embodiment the cylindrical shape portion 61 and the both conical portions 62, 62 are not formed explicitly, but the central portion in the axial direction of the collar member 6 is formed as the curving smallest diameter portion 64.

Figure 5B:
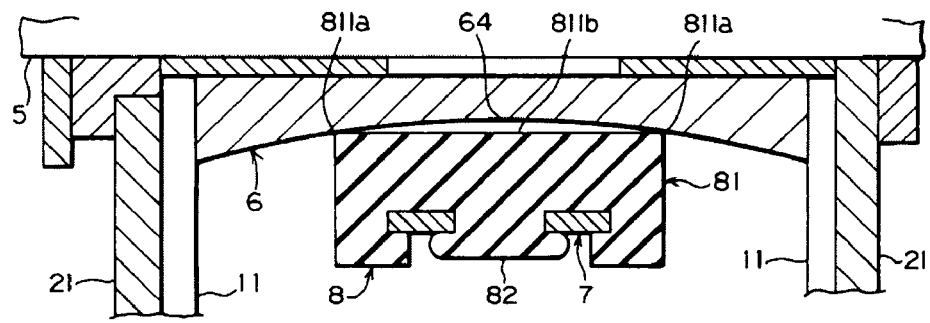
FIGS. 5B and 5C are operational diagrams each showing a step in which the collar member and the stopper shock-absorbing material abut against each other.
Figure 5C:
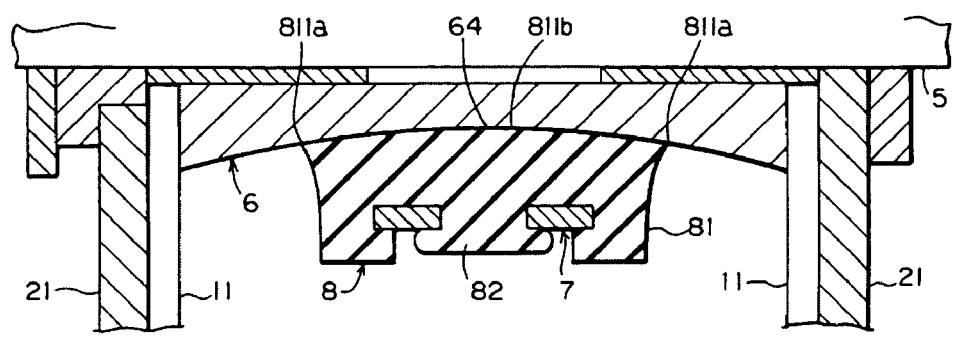

Therefore, in the abutted surface 811 of the stopper shock-absorbing material 8 which abuts against the collar member 6, the both end sections in the width direction first abut the outer circumferential surface of the collar member 6, and then the central section in the width direction of the abutted surface 811 gradually abuts against the outer circumferential surface of the collar member 6 (see FIGS. 5B and 5C). In the case of the collar member 6 of the second embodiment, because the outer circumferential surface thereof is formed into an arched shape along the axial direction, the step of abutting the both end portions 811a, 811a in the with direction first and then the central portion 811b of the abutted surface 811 of the stopper shock-absorbing material 8 has continuity and allows extremely quiet telescopic adjustment operation.

Figure 6A:
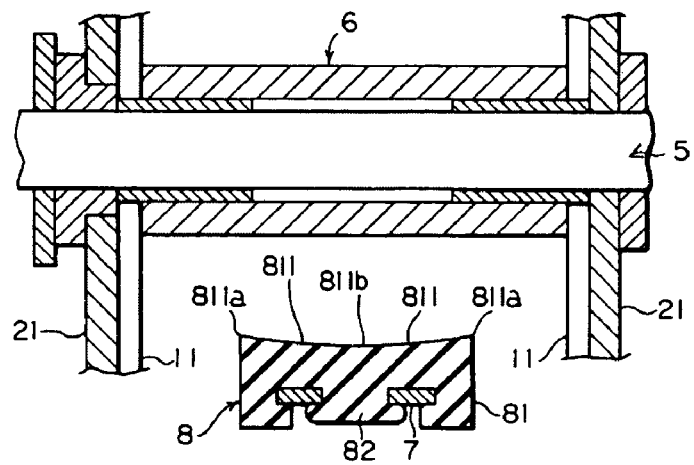
FIG. 6A is a cross-sectional diagram showing the configurations of a collar member of a third embodiment and of a first type of stopper shock-absorbing material of the second embodiment.
Figure 6B:
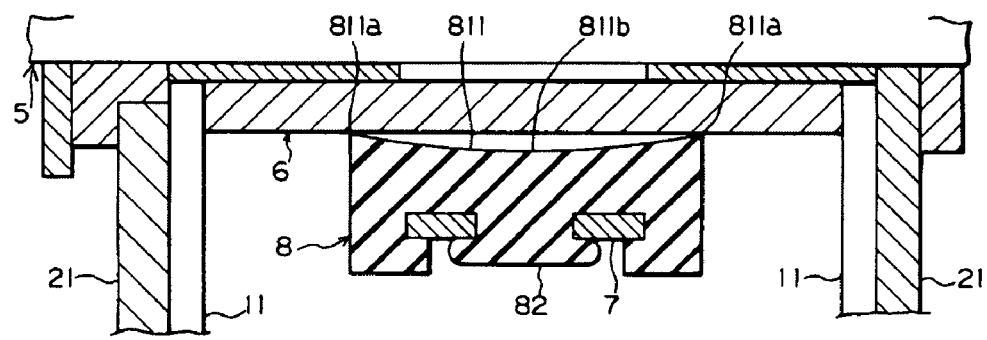
FIGS. 6B and 6C are operational diagrams each showing a step in which the collar member and the stopper shock-absorbing material abut against each other.
Figure 6C:
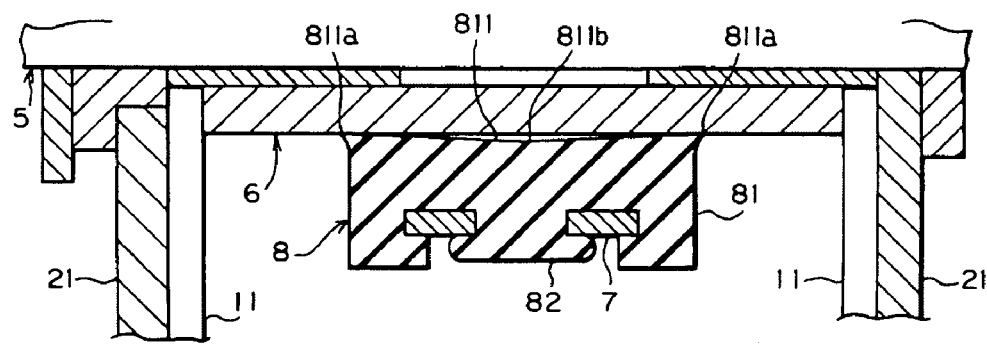
Figure 7A:
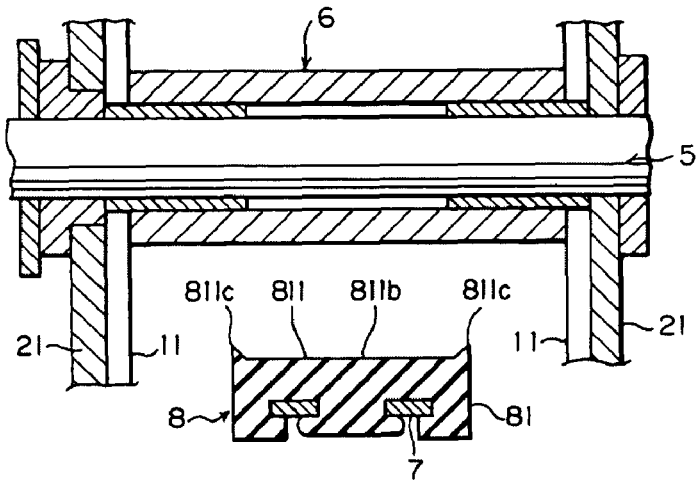
FIG. 7A is a cross-sectional diagram showing the configurations of the collar member of the third embodiment and of a second type of stopper shock-absorbing material of the second embodiment.
Figure 7B:
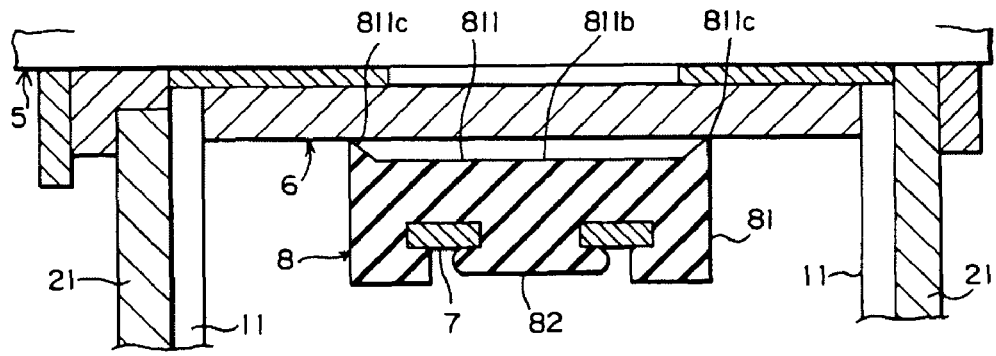
FIGS. 7B and 7C are operational diagrams each showing a step in which the collar member and the stopper shock-absorbing material abut against each other.
Figure 7C:
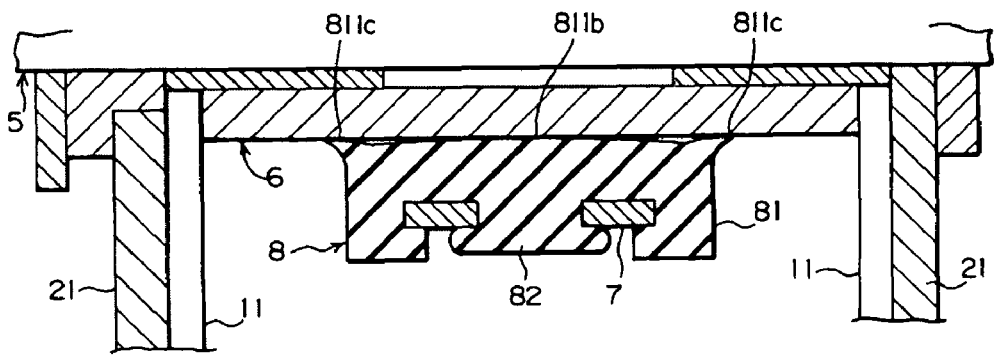
Figure 10B:
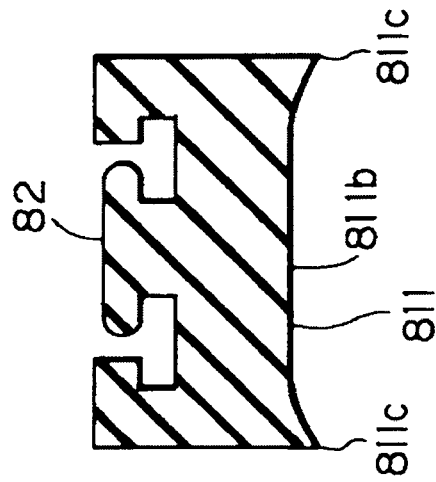
FIG. 10B is a cross-sectional diagram taken along the arrow Xf-Xf of FIG. 10A.
Figure 10A:
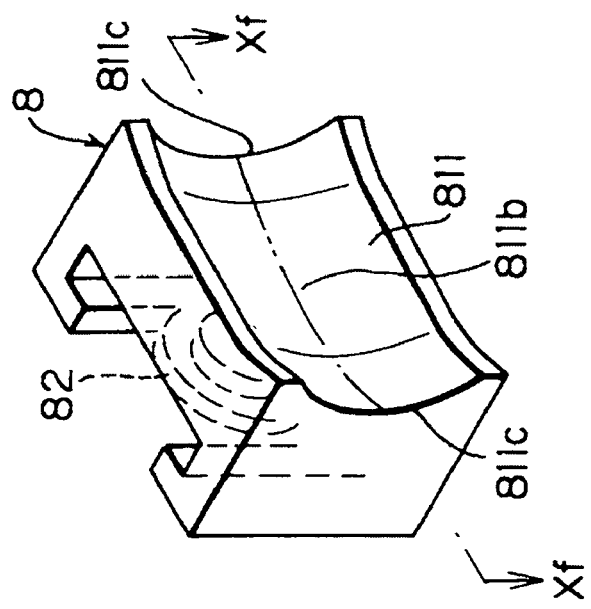
FIG. 10A is a perspective view showing the second type of stopper shock-absorbing material of the second embodiment which corresponds to the collar member of the third embodiment.

Next, stopper shock-absorbing materials 8 of the second embodiment which are applied to a collar member 6 of the third embodiment are each formed such that the both end sections in the width direction of the abutted surface 811 project. There are two types in the stopper shock-absorbing materials 8 of the second embodiment: in the first type the abutted surface 811 is formed into a concave arch shape along the width direction, as shown in FIG. 6A and FIG. 9; and in the second type, edge projecting portions 811c, 811c, which project from an outer circumference of this stopper shock-absorbing material 8 to a substantially a flange shape, are formed at the both end portions 811a, 811a in the width direction of the abutted surface 811, respectively, as shown in FIG. 7A and FIG. 10. Each edge projecting portion 811c is formed to have a substantially triangular cross-sectional shape. The central portion 811b between the edge projecting portions 811c, 811c forms a flat surface, i.e., a cylindrical shape. Either type is formed such that the both end portions 811a, 811a of the abutted surface 811 project more than the central portion 811b in the width direction.

When telescopic adjustment is performed in such a combination of the collar member 6 and the stopper shock-absorbing materials 8, the collar member 6 is first moved toward either one of the stopper shock-absorbing materials 8 in the longitudinal direction, and, at the instant of abutment between the stopper shock-absorbing material 8 and the collar member 6, the both end portions 811a, 811a in the width direction of the abutted surface 811 of the first type first abut against the outer circumferential surface of the cylindrical collar member 6. Then, the both end portions 811a, 811a are compressed while being elastically deformed, and then the central portion 811b abuts against (or sometimes only comes close to) the outer circumferential surface of the collar member 6 (see FIGS. 6B and 6C).

Next, in the case of the second type, the both edge projecting portions 811c, 811c in the width direction of the abutted surface 811 first abut against the outer circumferential surface of the cylindrical collar member 6. Then, the both edge projecting portions 811c, 811c are compressed while being elastically deformed, and then the central portion 811b abuts against (or sometimes only comes close to) the outer circumferential surface of the collar member 6 (see FIGS. 7B and 7C). Then, the shock force generated when the collar member 6 and the stopper shock-absorbing material 8 hit against each other during telescopic adjustment can be further reduced, and quietness and operational touch in telescopic adjustment can be improved. As described above, the stopper shock-absorbing materials 8 of the first and second embodiments were illustrated as the stopper shock-absorbing materials 8 applied to the collar members 6 of the first through third embodiments, but the combination of these components is not limited to the combinations described above. Therefore, the combination of the collar members 6 of the first through third embodiments and the stopper shock-absorbing materials 8 of the first and second embodiments may be set arbitrarily, and, for example, the stopper shock-absorbing materials 8 of the second embodiment can be applied to the collar member 6 of the first embodiment.

Figure 12A:
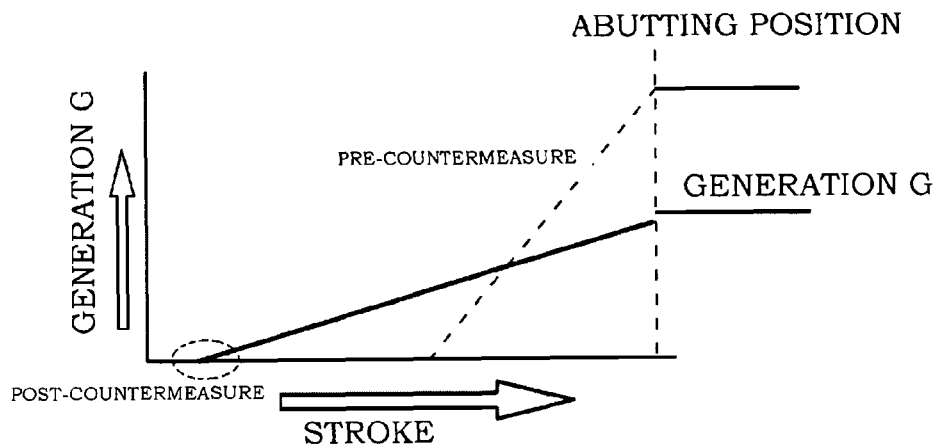
FIGS. 12A and 12B are graphs each showing the characteristics of the present invention.
Figure 12B:
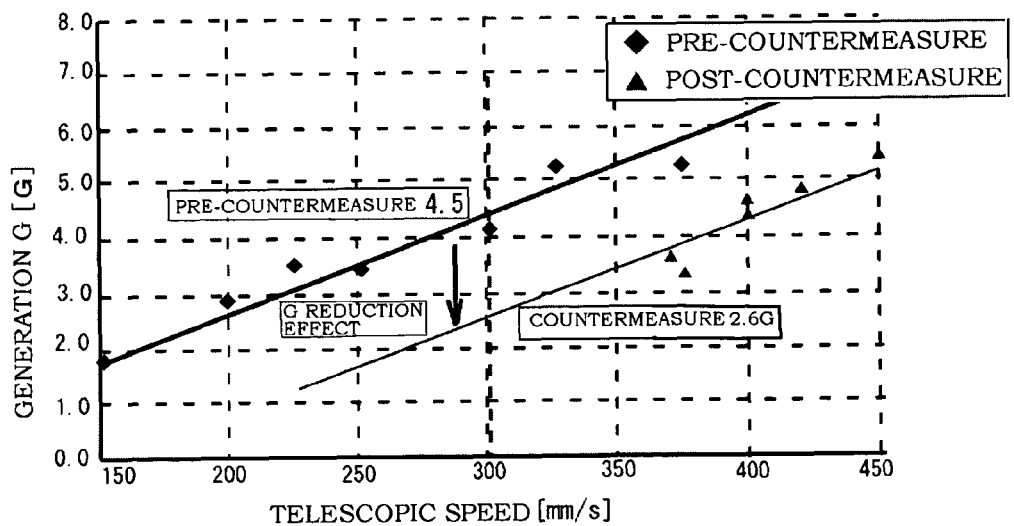

FIG. 12 is a graph showing the characteristics of the present invention. The graph of FIG. 12A shows that the performances drawn in thick lines can be achieved at the point of a post-countermeasure at which the present invention is applied. This post-countermeasure shows that the stroke between when the collar member 6 and the stopper shock-absorbing material 8 abut against each other and when they stop is extended. Therefore, this graph shows that generation G, i.e., a shock, between a pre-countermeasure and the post-countermeasure, is reduced. FIG. 12B shows the magnitude of a shock which is caused by the difference in telescopic speeds of abutment between the collar member 6 and the stopper shock-absorbing material 8 during telescopic adjustment. According to the present invention, the shock generated by the abutment is reduced at all telescopic speeds.

What is claimed is:

1. A steering wheel position adjustment device, comprising:
   a movable bracket including adjusting long holes on both sides in a width direction of the movable bracket;
   a fixed bracket;
   a lock shaft penetrating through both of the adjusting long holes to support the movable bracket to the fixed bracket;
   a collar member which is rotatably supported within the movable bracket by the lock shaft and is capable of moving along, with the lock shaft, in a longitudinal direction of the adjusting long holes; and
   stopper shock-absorbing materials, which are attached to both side sections, in the longitudinal direction of the adjusting long holes, within the movable bracket and each of which is formed thereon with an abutment surface against which the collar member abuts,
   wherein, when each of the stopper shock-absorbing materials and the collar member abut against each other, both end portions of the stopper shock-absorbing material, in an axial direction of the collar member, are first brought into abutment,
   wherein in the collar member, a cylindrical shape portion is formed in a central portion in the axial direction of the collar member and conical portions are formed such that a diameter of each of the conical portions gradually increases toward both ends in a width direction of the cylindrical shape portion, and
   wherein both of the end portions in the width direction of the abutment surface of the stopper shock-absorbing material abut against the conical portion.

2. The steering wheel position adjustment device according to claim 1, wherein the central portion in the axial direction of the collar member comprises a smallest diameter portion, and a cross-sectional shape of the collar member along the axial direction comprises a substantially arched shape such that the diameter thereof gradually increases toward both sides in the axial direction.

3. The steering wheel position adjustment device according to claim 1, wherein the abutment surface comprises a substantially concave arched cross section in the width direction thereof.

4. The steering wheel position adjustment device according to claim 1, wherein edge projecting portions are formed on both of the end portions of the abutment surface of the stopper shock-absorbing material.

5. A steering wheel position adjustment device, comprising:
   a movable bracket including adjusting long holes on both sides in a width direction of the movable bracket;
   a fixed bracket;
   a lock shaft penetrating through both of the adjusting long holes to support the movable bracket to the fixed bracket;
   a collar member which is supported within the movable bracket by the lock shaft and is capable of moving along, with the lock shaft, in a longitudinal direction of the adjusting long holes; and
   stopper shock-absorbing materials, which are attached to both side sections in the longitudinal direction of the adjusting long holes within the movable bracket, and each of which is formed thereon with an abutment surface against which the collar member abuts,
   wherein the abutment surface includes a substantially concave arched cross section in an axial direction of the collar member, and
   wherein upon abutment between the stopper shock-absorbing materials and the collar member, the abutment surface of the stopper shock-absorbing materials is brought into abutment, at both end sides in the width direction thereof, against the collar member, then, after a certain time interval, a central portion of the abutment surface, in the axial direction of the collar member, abuts against the collar member.

6. A steering wheel position adjustment device, comprising:
   a movable bracket including adjusting long holes on both sides in a width direction of the movable bracket;
   a fixed bracket;
   a lock shaft penetrating through both of the adjusting long holes to support the movable bracket to the fixed bracket;
   a collar member which is supported within the movable bracket by the lock shaft and is capable of moving along, with the lock shaft, in a longitudinal direction of the adjusting long holes; and
   stopper shock-absorbing materials, which are attached to both side sections in the longitudinal direction of the adjusting long holes within the movable bracket, and each of which is formed thereon with an abutment surface against which the collar member abuts,
   wherein edge projecting portions are formed on both of the end portions, in an axial direction of the collar member, of the stopper shock-absorbing materials, and
   wherein upon abutment between the stopper shock-absorbing materials and the collar member, the abutment surface of the stopper shock-absorbing materials is brought into abutment, at both end sides in the axial direction of the collar member, against the collar member, then, after a certain time interval, a central portion of the abutment surface, in the axial direction of the collar member, abuts against the collar member.

* * * * *